US008643697B2

(12) United States Patent
Hasegawa et al.

(10) Patent No.: US 8,643,697 B2
(45) Date of Patent: Feb. 4, 2014

(54) VIDEO PROCESSING APPARATUS AND VIDEO PROCESSING METHOD

(75) Inventors: Minoru Hasegawa, Fujisawa (JP); Nobuaki Kabuto, Kunitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 326 days.

(21) Appl. No.: 12/912,812

(22) Filed: Oct. 27, 2010

(65) Prior Publication Data

US 2011/0187818 A1    Aug. 4, 2011

(30) Foreign Application Priority Data

Jan. 29, 2010    (JP) .................................. 2010-017624

(51) Int. Cl.
*H04N 13/00*    (2006.01)
(52) U.S. Cl.
USPC .................................... 348/42; 348/E13.002
(58) Field of Classification Search
USPC ........................................................ 348/42
See application file for complete search history.

(56) References Cited

U.S. PATENT DOCUMENTS

| | | | | |
|---|---|---|---|---|
| 2006/0012612 | A1* | 1/2006 | Johnston et al. | 345/642 |
| 2007/0296876 | A1 | 12/2007 | Terada | |
| 2008/0252578 | A1* | 10/2008 | Kim et al. | 345/87 |
| 2008/0279292 | A1* | 11/2008 | Tanabe et al. | 375/260 |
| 2009/0128622 | A1* | 5/2009 | Uchiumi et al. | 348/51 |
| 2009/0161720 | A1* | 6/2009 | Pelletier | 374/4 |
| 2010/0231496 | A1* | 9/2010 | Yu et al. | 345/99 |
| 2010/0244708 | A1* | 9/2010 | Cheung et al. | 315/158 |
| 2011/0135466 | A1* | 6/2011 | Latorre et al. | 416/1 |
| 2011/0149019 | A1* | 6/2011 | Kellerman et al. | 348/42 |
| 2011/0213391 | A1* | 9/2011 | Rivers et al. | 606/159 |
| 2011/0267384 | A1* | 11/2011 | Fujiwara et al. | 345/690 |
| 2012/0057010 | A1* | 3/2012 | Yamauchi | 348/76 |
| 2012/0087752 | A1* | 4/2012 | Herbold et al. | 408/1 R |

FOREIGN PATENT DOCUMENTS

| | | |
|---|---|---|
| DE | 20010843 U1 | 9/2000 |
| EP | 2 053 855 | 4/2009 |
| EP | 2 202 993 | 6/2010 |
| JP | 64-047196 | 2/1989 |
| JP | 06-038244 | 2/1994 |
| JP | 06-254046 | 9/1994 |
| JP | 2003-260028 | 9/2003 |
| JP | 2008-3519 | 1/2008 |
| JP | 2010-021814 | 1/2010 |
| WO | WO 2007/036816 | 4/2007 |
| WO | WO 2007/085950 | 8/2007 |
| WO | WO2009/154595 | 12/2009 |

OTHER PUBLICATIONS

Office Action in EP 10189492.1-1902, dated Jun. 14, 2013 (5 pages). [in English].

(Continued)

*Primary Examiner* — Dave Czekaj
*Assistant Examiner* — Nam Pham
(74) *Attorney, Agent, or Firm* — Antonelli, Terry, Stout & Kraus, LLP.

(57) ABSTRACT

Video processing apparatus and method including a process for switching a 2D program and a 3D video program. The method has the steps of, for example: inputting a 3D video signal and a 2D video signal; discriminating whether the video signal which is inputted is the 3D video signal or the 2D video signal; and converting a clock frequency of the video signal which is determined as a 2D video signal.

14 Claims, 4 Drawing Sheets

(56) References Cited

OTHER PUBLICATIONS

Office Action in Japanese Patent Appln. Ser. No. 2010-017624, mailed May 21, 2013 (in Japanese, 2 pgs.).

Office Action in Chinese Patent Appln. Ser. No. 201010530524.3, mailed Apr. 3, 2013 (in Chinese, 7 pgs.), [English language translation, 2 pgs].

* cited by examiner

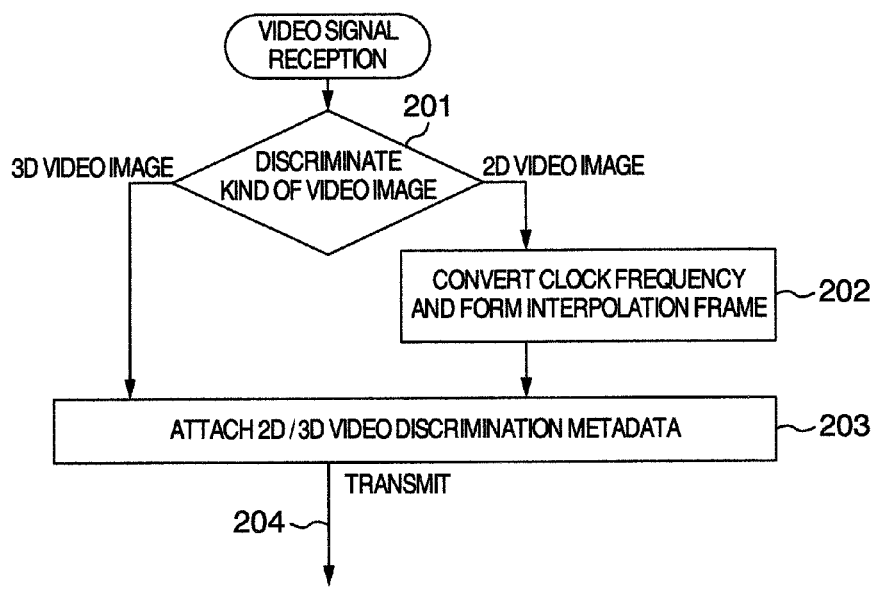
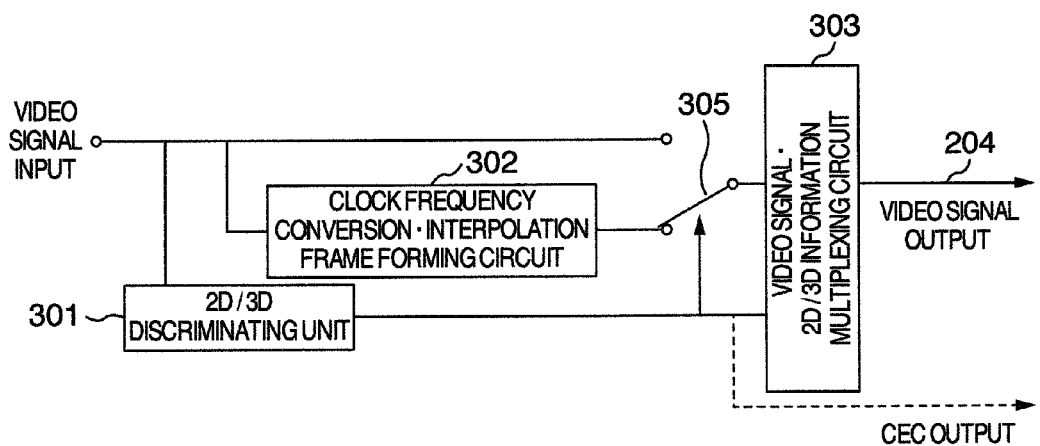

VIDEO PROCESSING APPARATUS AND VIDEO PROCESSING METHOD

INCORPORATION BY REFERENCE

The present application claims priority from Japanese application JP2010-017624 filed on Jan. 29, 2010, the content of which is hereby incorporated by reference into this application.

BACKGROUND OF THE INVENTION

The invention relates to a video processing apparatus and a video processing method for processing a video signal which is transmitted.

In JP-A-06-254046, there is disclosed such a technique that it is an object to "provide a video display apparatus in which a 3D image display and a 2D image display can be selectively switched and displayed onto one monitor, fatigue of the eyes of the user or the like is prevented, and a use efficiency can be improved" (refer to paragraph [0008] of JP-A-06-254046) and as a solution of such an object, there is provided "a video display apparatus comprising: a pair of right and left image pickup means having right and left binocular parallax for an object; and display means for reproducing a video image based on right and left video signals which are sent from the image pickup means onto a video reproducing display screen and displaying a stereoscopic video image, wherein the display means has a first signal processing function for displaying a 3-dimensional video image onto the display means and a second signal processing function for displaying a 2-dimensional video image onto the display means independent of the first signal processing function, and the apparatus further comprises signal processing function selecting means for selectively switching and operating the first signal processing function and the second signal processing function" (refer to paragraph [0009] of JP-A-06-254046).

SUMMARY OF THE INVENTION

FIG. 1 shows a progressive signal of one frame of a normal 2D video image. In the case of a video signal of a refresh rate of 60 Hz, a video image of one frame is transmitted for a period of time of 1/60 second and displayed onto a display screen. A video signal of a 3D video image is shown in FIG. 2. If it is intended to provide a video image of 60 Hz with respect to each of the right and left eyes, a video signal 4L for the left eye has to be transmitted for 1/120 second of the former half of 1/60 second (or for a time shorter than it) and a video signal 4R for the right eye has to be transmitted for 1/120 second of the latter half (or for a time shorter than it) (the order of the left eye and the right eye may be reversed). Therefore, if it is intended to maintain resolution (the number of dots of the video image), it is necessary to transmit the video signals at a clock frequency (the number of dots of the video image which is transmitted per unit time) which is twice as high as that of the 2D image.

In the case where the 2D video image and the 3D video image are switched, for example, in the case where a commercial of the 2D image is inserted into a program of the 3D image, at a moment of the switching of the 2D program and the 3D video program, or the like, the clock frequency changes to a double frequency or a half frequency.

As mentioned above, for example, in the case of switching between the 2D program and the 3D video program, a certain time is needed to cope with such a change in clock frequency in the display apparatus and, due to this, there is such a problem that the display is interrupted. In the case where an audio signal is transmitted together with the video signals, there is such a problem that the sound is also interrupted.

To solve the above problems, according to an embodiment of the invention, for example, there is provided a video processing method comprising the steps of: inputting a 3D video signal and a 2D video signal; discriminating whether the video signal which is inputted is the 3D video signal or the 2D video signal; and converting a clock frequency of the video signal which is determined as a 2D video signal.

According to the foregoing method, the interruption of the video image is suppressed and a display of the video image in which a use efficiency is high for the user can be provided.

Other objects, features and advantages of the invention will become apparent from the following description of the embodiments of the invention taken in conjunction with the accompanying drawings.

BRIEF DESCRIPTION OF THE DRAWINGS

FIG. 6 is a flowchart showing an example of a video signal process;

FIG. 7 is a diagram showing an example of a signal circuit; and

DESCRIPTION OF THE EMBODIMENTS

Figure 1:
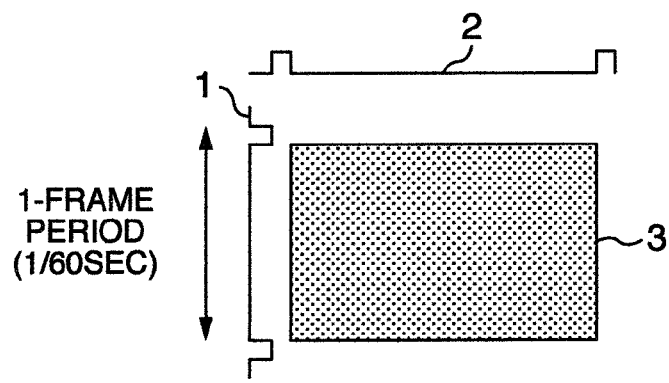
FIG. 1 is a diagram showing an example of a 2D video signal.
Figure 2:
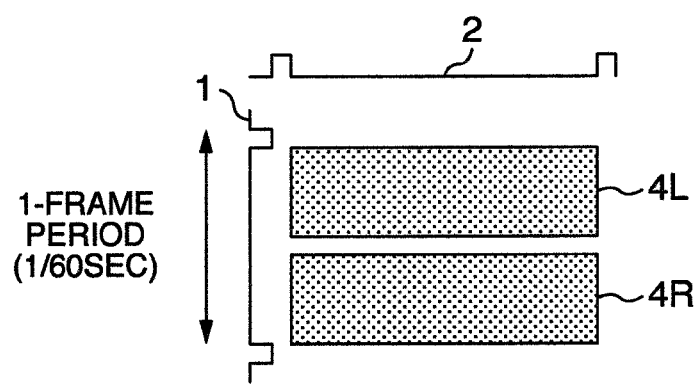
FIG. 2 is a diagram showing an example of a 3D video signal.

First, an example of a system construction of an embodiment will be described with reference to FIG. 8. A video signal 412 outputted from a player 402 such as a Blu-ray (registered trademark) player or the like is inputted to an audio amplifier 403.

A video signal process, which will be described hereinafter, is executed and a video signal 413 is outputted. A display apparatus (TV 404) which received the video signal 413 displays the video signal as a video image.

If the video signal is a video signal which enables a 3-dimensional video image to be displayed (hereinbelow, referred to as a "3D video signal", and the 3-dimensional video image is also referred to as a "3D video image",), a sync signal indicative of timing for opening/closing shutters of shutter glasses 405 is transmitted. The television 404 can also select and display an output video signal 411 of an STB (Set Top Box) 401 such as a cable television receiver or the like. A transmitting method of the video signals in the embodiment, which will be described hereinafter, can be applied to all of the video signals 411, 412, and 413.

Although the description has been made above on the assumption that the video signal process is executed in the audio amplifier 403, a similar signal process may be executed in the player 402 or the STB 401.

Figure 3:
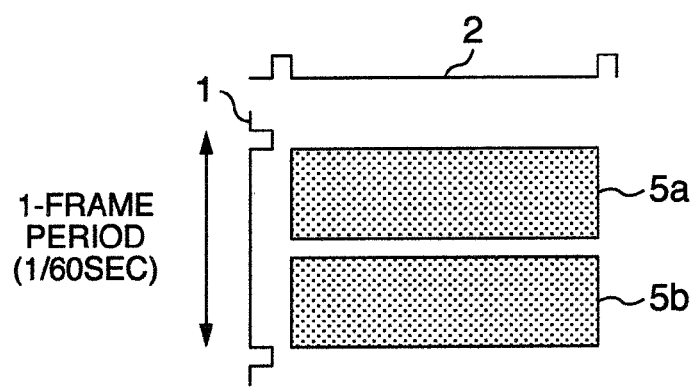
FIG. 3 is a diagram showing an example of a 2D video signal.

Subsequently, a transmission of the video signals processed in the audio amplifier 403 will be described. FIG. 3 shows the video signal in the case where a clock frequency of a video signal which enables a 2-dimensional video image to be displayed (hereinbelow, referred to as a "2D video signal", and the 2-dimensional video image is also referred to as a "2D video image",) is set to a frequency similar to that of the 3D video signal. Since the video signal is transmitted at the clock frequency which is twice as high as that in the case of FIG. 1, the transmission of the 2D video signal is finished for the half time of that in the case of FIG. 1.

Signals 5a and 5b are transmitted as same video signals. That is, for example, although the 2D video signal is transmitted in order of A→B→C→D (A, B, C, and D indicate different frames) at a frame rate of 60 Hz in a normal state, by transmitting the 2D video signal in order of A→A→B→B→C→C→D→D at a refresh rate of 120 Hz, the clock frequency in the case of transmitting the 2D video signals can be also set to the same clock frequency as that in the case of transmitting the 3D video signal.

Figure 4:
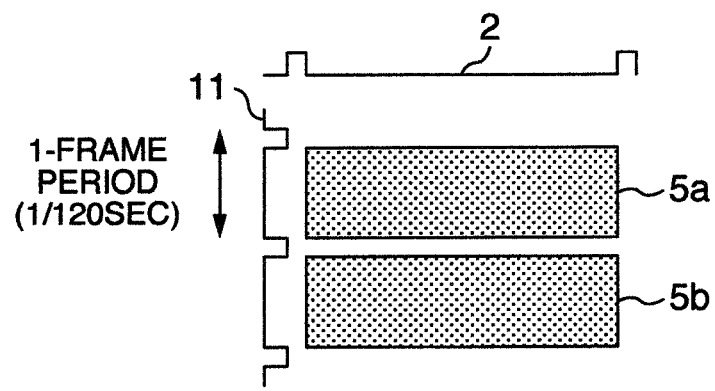
FIG. 4 is a diagram showing an example of a 2D video signal.

At this time, the same video signals 5a and 5b may be transmitted as illustrated in FIG. 4 by using a vertical sync signal 11 of 120 Hz in place of a vertical sync signal 1 of 60 Hz. By changing the frequency of the vertical sync signal, the 2D video signal and the 3D video signal can be also discriminated.

In FIGS. 3 and 4, it is not always necessary that the video signal 5b which is transmitted at the second time is the same as the video signal 5a which is transmitted at the first time. For example, the video signal 5b may be formed by using such a technique that information of a motion vector of the video image is detected from a plurality of frames of the input video signal 5a and an interpolation frame 5b is formed. By forming the interpolation frame, there is such an advantage that the video image of the smooth motion can be displayed. Further, in the case where the display apparatus is an LCD or the like and it is intended to improve a response speed of the motion image, the video signal which is transmitted at the second time may be a video signal for black display or for all black screen image (nothing is displayed).

Figure 5:
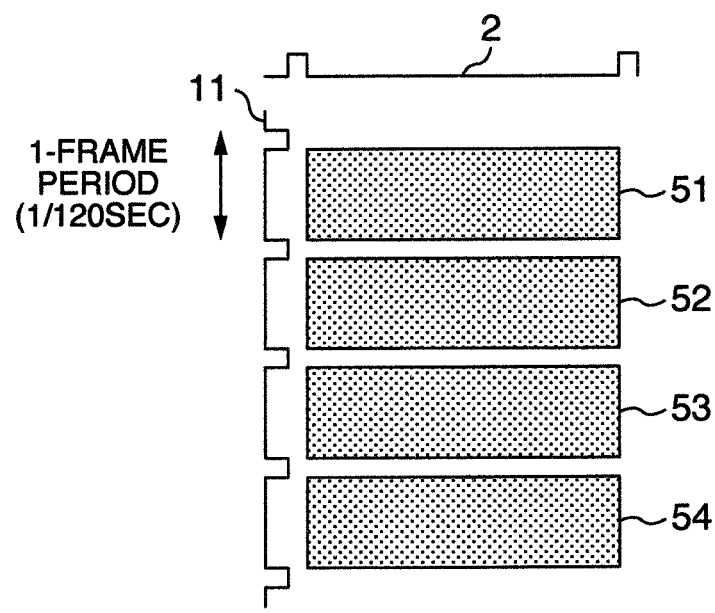
FIG. 5 is a diagram showing an example of a 2D video signal.

In the case of transmitting the 2D video signals of inherently 120 Hz instead of the interpolation video signal, 2D video signals 51, 52, 53, and 54 of 120 Hz may be sequentially transmitted as illustrated in FIG. 5.

By executing the above processes, even in the case of the 2D video image, the contents can be transmitted at the same clock frequency as that of the 3D video image. Therefore, upon switching of the 3D video image and the 2D video image, the display of the display apparatus can be rapidly switched.

After the clock frequency of the 2D video signal was converted as mentioned above on a transmitting apparatus side for transmitting the video signal, by transmitting the video signal to the display apparatus side serving as a receiving side, the display apparatus can smoothly display the contents in which the 2D video image and the 3D video image exist mixedly.

In the display apparatus which receives the video signal, first, even if the video signal before the clock frequency is converted is received in a clock frequency converting unit in the display apparatus, the clock frequency conversion as mentioned above is executed, and the video signal is inputted to a display circuit after that, a similar effect is obtained.

In the case of transmitting the 3D video signal and the 2D video signal at the same clock frequency as mentioned above, since it is difficult to discriminate from the clock frequency and a video format, it is useful to add metadata showing whether the video signal which is being transmitted is the 3D video signal or the 2D video signal and to transmit the resultant video signal.

In the case of using, for example, an HDMI (registered trademark) (High Definition Multimedia Interface) for a video signal transmitting line, the metadata may be disclosed in an Infoframe which is multiplexed to the video signal or may be transmitted by a CEC (Consumer Electronics Control).

An example of a process in the case of adding the metadata showing whether the video signal is the 3D video signal or the 2D video signal to the video signal is shown in a flowchart of FIG. 6. The process may be executed before or after the process for the 2D video signal or may be executed in parallel with such a process. However, in order to make the discrimination about whether the input video signal is the 2D video signal or the 3D video signal easier, it is preferable to execute such a process before the process for the 2D video signal.

Whether the input video signal is the 3D video signal or the 2D video signal is discriminated from information such as clock frequency, metadata, contents, or the like in a video kind discriminating step 201.

If it is determined that the input video signal is the 2D video signal and its clock frequency differs from that of the 3D video signal, the input video signal is converted into the same clock frequency as that of the 3D video signal in a clock frequency converting step 202. In the conversion of the clock frequency, such a process that the same frame is copied and repeated every two times, an interpolation frame is formed and inserted between original frames, or the like is executed as necessary. With respect to the 2D video signal inherently having the same clock frequency as that of the 3D video signal, it is not always necessary to execute the conversion of the clock frequency or the creation of the interpolation frame in step 202.

The number of times of copying the same frame or the number of interpolation frames which are inserted may be properly changed according to the frequency to be converted. For example, if the 3D video signal is constructed from three viewpoints of LCR, its frequency is equal to 180 Hz, and a frequency of the 2D video signal is equal to 60 Hz, it is sufficient that the same frame is copied and repeated every three times or the number of interpolation frames is set to a value which is twice as large as the number of original frames.

In step 203, the metadata indicative of the 2D video image is added to the formed video signal. If the input video signal is the 3D video signal and the metadata showing such a fact is not added, the metadata indicative of the 3D video signal is similarly added here. A video image 204 formed in this manner is transmitted.

Although an example in which the metadata is added to both of the 2D video signal and the 3D video signal has been shown here, for example, it is also possible to construct in such a manner that a process is performed so as to add the metadata only to the 3D video signal and in the apparatus which received the processed video signal, it is determined that the video signal added with the metadata is the 3D video signal and the video signal to which the metadata is not added is the 2D video signal. It is also possible to construct in such a manner that a process is performed so as to add the metadata only to the 2D video signal and in the apparatus which received the processed video signal, it is determined that the video signal added with the metadata is the 2D video signal and the video signal to which the metadata is not added is the 3D video signal.

Subsequently, a display of the video signal in the apparatus which received the video signal to which the foregoing process has been performed will be described. With respect to the display of the 3D video image in the apparatus, the following functions may be made operative as necessary: (1) generation of a sync signal such as an infrared signal or the like adapted to synchronize the display timing of the display apparatus with the timing for opening/closing the shutters of the shutter glasses; (2) correction of luminance of the display apparatus to compensate a luminance decrease that is caused when the video signal passes through the shutter glasses; (3) an image process which is executed in consideration of fatigue of the eyes of the viewer; and (4) in the audio amplifier which is connected upon reproduction of the 3D video image, a 3D sound field reproducing mode is designated and synchronization is attained to the 3D reproduction of the video image and the audio sound. As a signal for making those functions operative, the metadata showing whether the video signal which is transmitted is the 3D video signal or the 2D video signal can be used.

The function of (2) mentioned above will be described further in detail. Although the shutter for the left eye and the shutter for the right eye of the shutter glasses alternately repeat the on (open) and off (close) operations in the 3D display state, both of the shutter for the left eye and the shutter for the right eye of the shutter glasses are turned on in the 2D display state. Thus, when the viewer monitors the 2D video signal, light transmittance of the shutter glasses can be apparently set to a value which is about two or more times as large as that in the case where the viewer monitors the 3D video signal.

If it is intended that the luminance of the display screen at which the viewer feels in the display of the 3D video signal and that in the display of the 2D video signal are made constant, it is sufficient that the luminance of the display screen in the case of displaying the 2D video signal is set to a value which is about half of that in the case of displaying the 3D video signal. Thus, electric power consumption of the display apparatus can be reduced.

Subsequently, a construction of an apparatus for executing the foregoing signal processes to the video signal and outputting the processed signal will be described with reference to FIG. 7. The input video signal is inputted to a switch 305, a clock frequency conversion•interpolation frame forming circuit 302, and a 2D/3D discriminating unit 301.

If a discrimination result in the 2D/3D discriminating unit 301 indicates the 3D video signal or the 2D video signal of the same clock frequency as that of the 3D video signal, the switch 305 selects the input video signal and outputs to a video signal•2D/3D information multiplexing circuit 303.

If the discrimination result in the 2D/3D discriminating unit 301 indicates the 2D video signal and its clock frequency differs from that of the 3D video signal, the switch 305 selects an output of the clock frequency conversion•interpolation frame forming circuit 302 and outputs to the video signal•2D/3D information multiplexing circuit 303. In this manner, the 2D video signal and the 3D video signal can be outputted at the same clock frequency.

Further, information based on the discrimination result in the 2D/3D discriminating unit 301 (discrimination about the 2D/3D video signals, the presence or absence of the conversion of the clock frequency of the 2D video signal, a frame interpolating method, and the like) is sent to the video signal•2D/3D information multiplexing circuit 303, multiplexed to the video signal, and outputted as a signal 204.

The discrimination result in the 2D/3D discriminating unit 301 may be transmitted by an independent signal line, for example, a CEC line of HDMI (registered trademark). In this case, the multiplexing of the discrimination result in the 2D/3D discriminating unit 301 may be omitted. The addition of the metadata in step 203 in FIG. 6 may be performed in the multiplexing circuit 303.

The reproduction synchronization of the 3D video image and the 3D sound image mentioned above will be further described with reference to FIG. 8. The television 404 switches the 2D/3D displays in the TV with reference to the metadata about the 2D/3D video signal discrimination in the embodiment. However, there is a case where when the viewer does not put on the glasses, even if the 3D video signal was inputted, the 2D video image display is held.

In this case, the 2D/3D switching for the video image and the sound image can be synchronized by instructing by, for example, the CEC line of HDMI (registered trademark) so that the audio amplifier 403 reproduces the 3D sound image only for a period of time during which the television actually displays the 3D video image.

Particularly, in the case where the television 404 selects the 3D video signal from the STB 401 and displays the 3D video image, since the video signal of the STB 401 is not inputted to the audio amplifier 403, whether the television 404 displays the 3D video image or the 2D video image is obscure. Therefore, such a 3D sound image reproducing instruction from the television is useful.

Figure 8:
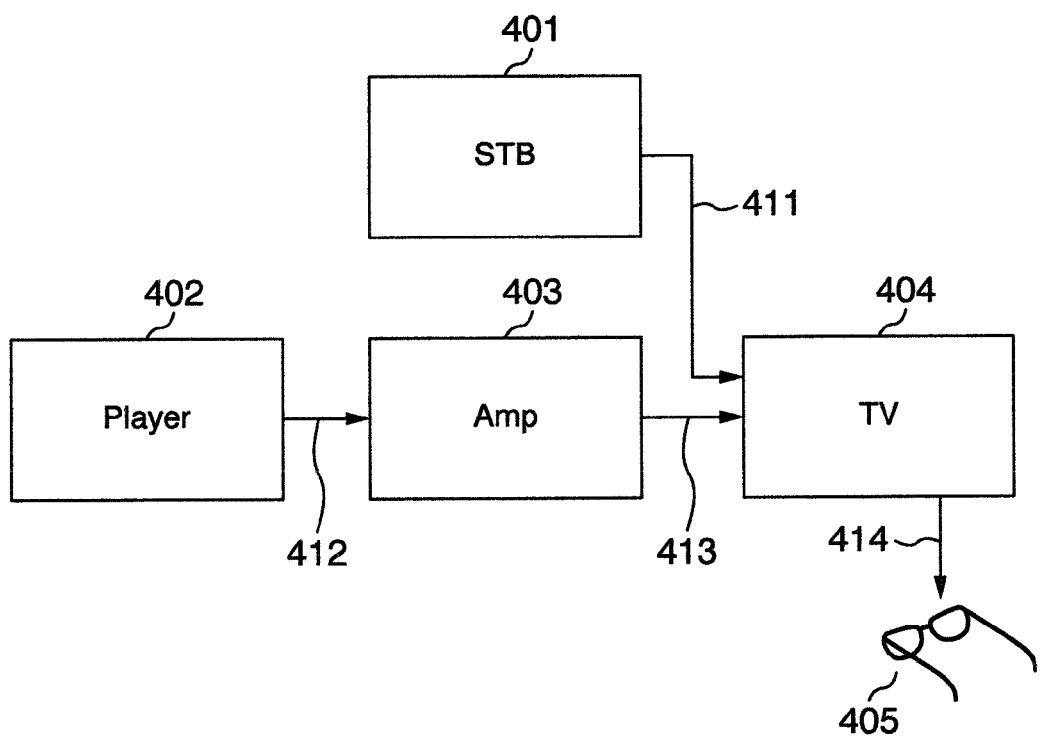
FIG. 8 is a diagram showing an example of a system construction.

A constructional diagram of FIG. 8 is an example and is not always limited to such a construction. For example, it is also possible to construct in such a manner that the processes shown in FIGS. 6 and 7 are executed in the player 402 and in the audio amplifier 403, the video signal is outputted as it is and only the reproduction of the audio signal is performed. It is also possible to construct in such a manner that in the television 404, the 2D video signal and the 3D video signal of the different clock frequencies from the audio amplifier 403 are received and the processes in FIGS. 6 and 7 are executed in the television 404.

As mentioned above, according to the embodiment, since the 2D video signal and the 3D video signal are transmitted at the same clock frequency, such a problem that the display and the sound are momentarily interrupted as a consequence of the switching of the clock frequency, can be eliminated.

By adding the signal (metadata) to distinguish whether the input video signal is the 2D video signal or the 3D video signal, even if the clock frequencies are the same, the means for distinguishing whether the input video signal is the 2D video signal or the 3D video signal is obtained. In the case of displaying the 3D video image, a degree at which the operations which are executed by the display apparatus and its peripheral devices are obstructed decreases.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video processing apparatus comprising:
   an input unit to which a content, in which a 3D video signal and a 2D video signal exist mixedly, is inputted;
   a discriminating unit for discriminating whether a video signal of the content which is inputted to said input unit is a 3D video signal or a 2D video signal; and
   a frequency converting unit for converting a clock frequency of a video signal of the content which was determined as a 2D video signal by said discriminating unit; and
   a video signal output unit for outputting a video signal of the content inputted to said input unit or a video signal of the content whose clock frequency has been converted by said frequency converting unit in accordance with a determination made by the discriminating unit, wherein said frequency converting unit is configured to convert the clock frequency of a video signal of the content which was determined as a 2D video signal by said discriminating unit into a same clock frequency as a clock frequency of the 3D video signal which is inputted to said input unit, wherein said video signal output unit is configured to output the 3D video signal inputted to said input unit without converting the clock frequency of the 3D video signal when a video signal of the content inputted to said input unit is determined by the discriminating unit to be the 3D video signal, and wherein said video signal output unit is configured to output the 2D video signal whose clock frequency has been converted by said frequency converting unit to be the same clock frequency as the 3D video signal inputted to said input circuit when a video signal of the content inputted to said input unit is determined by the discriminating unit to be the 2D video signal.

2. An apparatus according to claim 1, wherein information showing whether the video signal is the 3D video signal or the 2D video signal is added to said video signal which is inputted to said input unit.

3. An apparatus according to claim 2, further comprising a multiplexing unit for multiplexing the video signal which is inputted to said input unit and the information showing whether said video signal is the 3D video signal or the 2D video signal.

4. An apparatus according to claim 1, further comprising:
a control information output unit for outputting the information showing whether the video signal is the 3D video signal or the 2D video signal to said video signal which is inputted to said input unit.

5. An apparatus according to claim 1, wherein said frequency converting unit converts the clock frequency of said 2D video signal by transmitting a same frame in the 2D video signal a plurality of number of times.

6. An apparatus according to claim 1, wherein said frequency converting unit converts the clock frequency of said 2D video signal by inserting a frame for displaying an all black screen image into the 2D video signal.

7. An apparatus according to claim 1, wherein said frequency converting unit converts the clock frequency of said 2D video signal by inserting an interpolation frame formed on the basis of frames in the 2D video signal.

8. A video processing method comprising the steps of:
inputting a content in which a 3D video signal and a 2D video signal exist mixedly;
discriminating whether a video signal of the content which is inputted is a 3D video signal or a 2D video signal;
converting a clock frequency of a video signal of the content which was determined in the discriminating step to be a 2D video signal; and
outputting a video signal of the content inputted or a video signal of the content whose clock frequency has been converted by said frequency converting step in accordance with a determination made in said discriminating step, wherein said frequency converting step converts the clock frequency of a video signal of the content which was determined as a 2D video signal by said discriminating step into a same clock frequency as a clock frequency of the 3D video signal which is inputted in said input step, wherein said video signal outputting step outputs the 3D video signal inputted without converting the clock frequency of the 3D video signal when a video signal of the content inputted in said input step is determined by the discriminating step to be the 3D video signal, and wherein said video outputting step outputs the 2D video signal whose clock frequency has been converted by said frequency converting step to be the same clock frequency as the 3D video signal inputted in said input step when a video signal of the content inputted discriminating by the discriminating step to be the 2D video signal.

9. A method according to claim 8, wherein information showing whether the video signal is the 3D video signal or the 2D video signal is added to said video signal which is inputted.

10. A method according to claim 9, further comprising the step of multiplexing the video signal which is inputted and information showing whether said video signal is the 3D video signal or the 2D video signal.

11. A method according to claim 8, further comprising the steps of:
outputting information showing whether the video signal which is inputted is the 3D video signal or the 2D video signal from a signal line different from a signal line for outputting said video signal.

12. A method according to claim 8, wherein the clock frequency of said 2D video signal is converted by transmitting a same frame in the 2D video signal a plurality of number of times.

13. A method according to claim 8, wherein the clock frequency of said 2D video signal is converted by inserting a frame for displaying all black screen image into the 2D video signal.

14. A method according to claim 8, wherein the clock frequency of said 2D video signal is converted by inserting an interpolation frame which is formed on the basis of frames in the 2D video signal.

* * * * *